March 11, 1969 J. R. RAIRDEN III, ET AL 3,432,416

HIGH PURITY NIOBIUM FILMS FORMED BY GLOW DISCHARGE CATHODE SPUTTERING

Filed Oct. 3, 1966

Inventors :
John R. Rairden, III
James T. Furey
by John J. Kissane
Their Attorney.

United States Patent Office 3,432,416
Patented Mar. 11, 1969

3,432,416
HIGH PURITY NIOBIUM FILMS FORMED BY GLOW DISCHARGE CATHODE SPUTTERING

John R. Rairden III, Niskayuna, and James T. Furey, Schenectady, N.Y., assignors to General Electric Company, a corporation of New York Filed Oct. 3, 1966, Ser. No. 583,618
U.S. Cl. 204—192 2 Claims
Int. Cl. C23c 15/00

Figures 1, 2, 5:
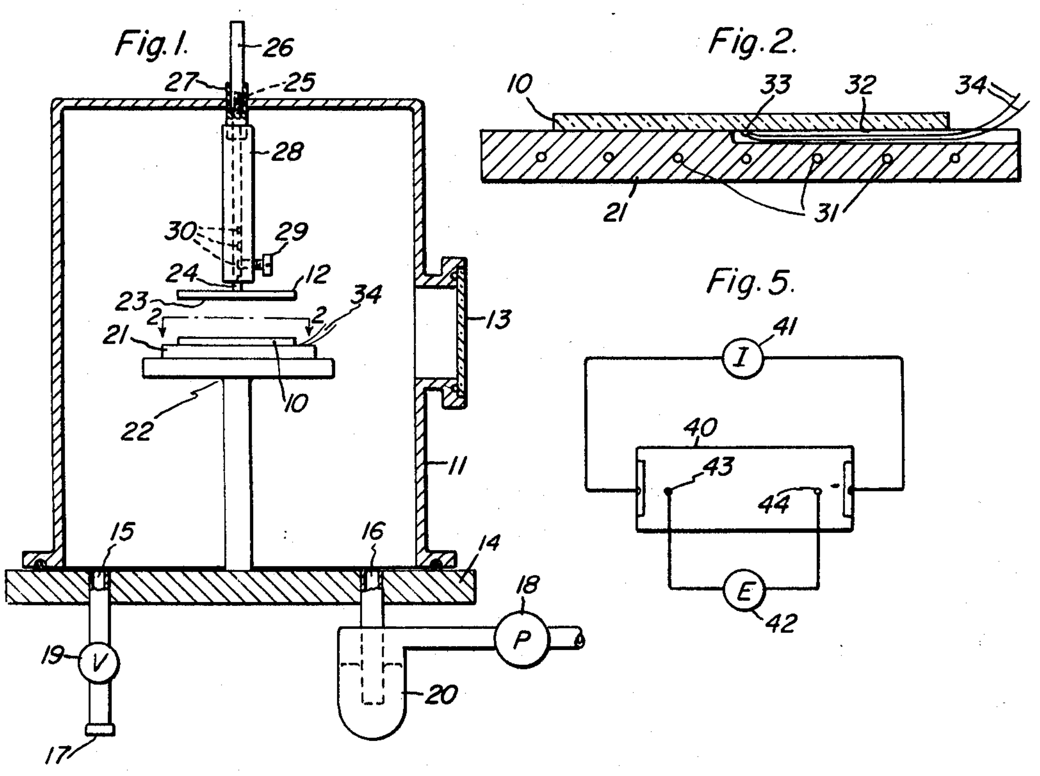

This invention relates to a method of forming superconductive films, and in particular to a glow discharge cathode sputtering method for the disposition of high purity niobium films on a substrate.

The ability of a thin film of niobium to rapidly switch from its resistive state to its superconductive state upon a variation of an applied magnetic field adapts the metal to applications employing binary logic and in recent years considerable effort has been expended to develop improved methods for the commercial manufacture of such films. Because niobium is affected adversely by the quantity of dissolved oxygen present in the deposited film, the formation of niobium thin films by evaporation generally has required ultra-high vacuum techniques to produce an environment having a pressure range of approximately $10^{-10}$ torr wherein the evaporation is accomplished.

It has been proposed in an article by J. R. Rairden and C. A. Neugebauer, entitled "Critical Temperature of Niobium and Tantalum Films," published in the Proceedings of the I.E.E.E., vol. 52, No. 10, pages 1234–1238, October 1964, that superconductive films of niobium with correct transition properties can be prepared by evaporation of the metal in a standard vacuum system having a pressure on the order of $10^{-5}$ torr. Thin film deposition by cathode sputtering, particularly as disclosed on page 1235, was accomplished in an argon atmosphere at a pressure of 125 microns by the application of 2000 volts to a wire mesh cathode of high purity niobium. Niobium atoms dislodged from the cathode were deposited as a thin film on a substrate positioned proximate the cathode. In accordance with the teaching on page 1236 of the publication that increasing the substrate temperature increases the resistance ratio of the deposited film, e.g. the ratio of the change in resistivity of the film between a room temperature of 298° K. and a temperature slightly in excess of the superconducting critical temperature of the film to the resistivity of the film at the temperature slightly in excess of the superconducting critical temperature of the film, a resistance-wound auxiliary heater was provided to heat the substrate. The maximum resistance ratio obtainable by cathode sputtering as disclosed in FIG. 3 on page 1237 was approximately 2. This value is inadequate in view of the fact that the highest obtainable resistance ratio is desired in superconductive thin films with a ratio of 3 generally being a minimum acceptable limit for commercially useful thin films.

It is an object of this invention to provide an improved method of depositing niobium films by cathode sputtering.

It is a further object of this invention to provide a method of depositing thin niobium films by cathode sputtering under closely controlled environmental conditions which will produce resistance ratios in the deposited films higher than previously obtainable by cathode sputtering.

In depositing high purity niobium films, in accordance with this invention, a niobium member and a substrate are positioned within a closed chamber in proximate relationship with each other and an inert gaseous atmosphere of fixed pressure is introduced into the chamber. After preheating the substrate to a temperature in excess of 25° C., the niobium member is energized with an electrical potential of sufficient intensity relative to the pressure of the inert gaseous atmosphere to raise the temperature of the cathode above 800° C. and produce a rapid sputtering of the niobium. The thermal input of the substrate is carefully controlled during the sputtering to produce a temperature in the range of from 535° C. to 690° C. upon the surface of the substrate remote from the niobium member. Niobium atoms dislodged from the member are condensed on the heated substrate to form a high purity film which exhibits a high resistance ratio of three or greater. Prior to this time, resistance ratios of this magnitude only were obtainable either by electron beam evaporation techniques at the expense of the superior adhesion between the deposited film and substrate generally obtainable with sputtering or by vapor plating techniques requiring elevated substrate temperatures of approximately 1200° C.

While it had previously been supposed that high purity niobium films could best be obtained by heating the substrate upon which the film was to be deposited to a temperature approaching the melting point of the substrate, it has been discovered that optimum results are obtainable when the surface of the substrate remote from the niobium member is controlled to produce a temperature in the range of from 535° C. to 690° C. Because the heat generated by the sputtering niobium cathode generally is not sufficient to produce substrate temperatures within the critical range of this invention, it has been found necessary both to pre-heat the substrate to a temperature in the range of from 190° C. to 475° C. before the initiation of sputtering and to sustain the application of heat during sputtering.

Figure 3:
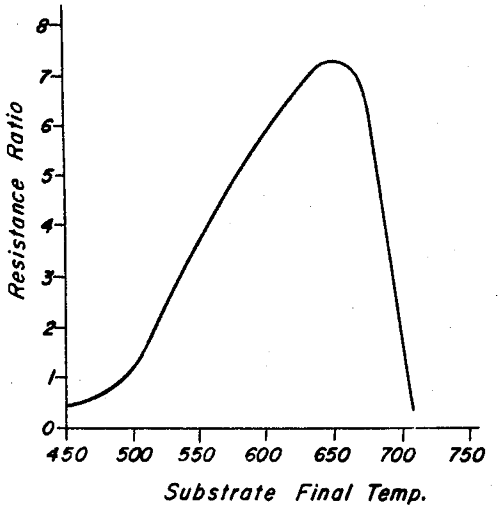
Figure 4:
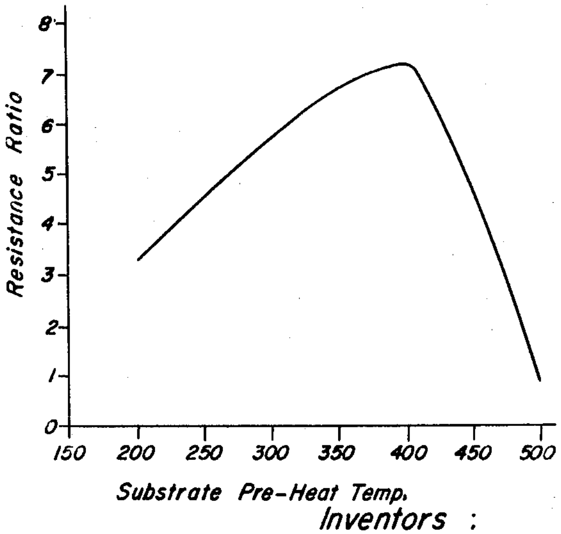

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 illustrates a cathode sputtering system utilized in performing the method of this invention, FIG. 2 is an enlarged sectional view of the substrate and substrate heater taken along lines 2—2 of FIG. 1, FIG. 3 is a curve portraying the variation in the resistance ratio of the deposited film with the temperature of the substrate surface remote from the niobium cathode, FIG. 4 is a curve which shows the variation in the resistance ratio of the deposited film in relation to the preheating temperature of the substrate, and FIG. 5 is a schematic drawing portraying the method employed to measure the resistance ratio of the deposited films.

Referring more particularly to the cathode sputtering system disclosed in FIG. 1, the substrate 10 upon which the thin niobium film is to be deposited is situated within an enclosed chamber 11 in proximate position to a cathode 12 formed of pure niobium. A sight port 13 is located in the side wall of the chamber to permit visual observation of the deposition process. The chamber is supported upon a base plate 14 which extends slightly beyond the vertical sidewalls of the chamber. Dual apertures 15 and 16 are provided within the base plate to communicate the interior of the chamber with an external source of inert gas 17 and a vacuum pump 18 through variable flow valve 19 and liquid nitrogen cooled trap 20, respectively, to permit regulation of the environmental atmosphere within the chamber.

Substrate 10 is seated upon a resistance-wound auxiliary heater 21 and is retained in an elevated position approximately centrally located within the chamber by a pedestal 22.

Cathode 12 is fabricated from high purity niobium and preferably includes a rectangular plate 23 and an elongated rod 24 which is centrally affixed to the face of the plate remote from the substrate. Although a niobium wire mesh also is suitable for utilization as a cathode, a solid plate is preferred because of its longer life and more uniform distribution of film upon the substrate. The end 25 of niobium rod 24 remote from plate 23 is threadedly secured to a stainless steel extension 26 which protrudes through insulating sleeve 27 centrally positioned within the cover plate of chamber 11 to permit external connection of a high voltage electrical potential (not shown) to the cathode. Niobium rod 24 situated within chamber 11 is enclosed within a stainless sleeve 28 which functions as a glow suppressor to prevent sputtering from the rod. Finger screw 29 extending through an aperture in the sidewall of glow suppressor 28 is threadedly engaged within one of a plurality of tapped bores 30 in niobium rod 24. The choice of tapped bore into which finger screw 29 is threaded determines the vertical positioning of the cathode.

As can be more clearly seen in FIG. 2, substrate 10 is positioned on a resistance-wound auxiliary heater 21 whose thermal output can be carefully regulated by the magnitude of the current flow through conductors 31 embedded within the body of the auxiliary heater. An elongated slot 32 extends across the top face of auxiliary heater 21 to house thermocouple 33 and leads 34 which leads externally communicate the readings of the thermocouple to a control system (not shown) regulating current flow through conductors 31. The depth of slot 32 is such that thermocouple 33 extends slightly beyond the top face of the heater and solidly contacts the face of substrate 10 remote from the cathode.

In performing the method of this invention, cathode 12 is positioned proximate substrate 10 and finger screw 29 is tightened within one of tapped bores 30 to fixedly secure the cathode in location. Chamber 11 then is evacuated by vacuum pump 18 and an atmosphere of inert gas is admitted into the chamber through flow valve 19 to raise the pressure of the chamber to approximately 150 microns. While any non-reactive gas can be utilized as an atmosphere for the niobium disposition, in practice argon was used because of its ready availability at a reasonable cost. The heavier of the inert gases generally are preferred because of their enhanced sputtering with niobium. Auxiliary heater 21 is energized by an external source of electricity to raise the temperature of substrate 10, as measured by thermocouple 33, to a value above 25° C. and an electrical potential of approximately 3400 volts is applied through extension rod 26 to cathode 12. The energization of the cathode ionizes the argon atmosphere to produce bombardment of the cathode thereby dislodging niobium atoms which diffuse about the enclosed chamber. To produce the rapid cathode sputtering rate necessary for high purity niobium depositions, the electrical potential applied to the cathode shoulde be of sufficient intensity relative to the pressure of the inert gaseous atmosphere to raise the surface temperature of the niobium above 800° C. The temperature of the substrate, as controlled by the thermal emissions of the cathode and by the substrate heater 21, is carefully regulated to produce a temperature in the range of from 535° C. to 690° C. on the substrate surface remote from cathode 12. As is seen from FIG. 3, it is only with substrate temperatures in this range that high resistance ratios of 3 and more are obtained. Outside of this range the resistance ratio of the thin films deposited on the substrate fall off very sharply to a value of 2 or less at temperatures below 510° C. and above 710° C. In other words, a 20 percent increase in the substrate temperature above 510° C. as measured by thermocouple 33 produces an increase in the resistance ratio of the deposited niobium film of over 400 percent. Similarly a 5 percent increase in the substrate temperature above 675° C. produces a drop in the resistance ratio of the deposited film of over 85 percent. To obtain final temperatures in the order of 650° C. upon the surface of the substrate remote from the cathode, it generally has been found necessary to preheat the substrate to a temperature of approximately 400° C. before the initiation of sputtering.

Referring to FIG. 4 which depicts the resistance ratio of the thin film deposited on the substrate in relation to the amount of preheating utilized on the substrate, it will be noted that a flatter curve is obtained than the curve of FIG. 3. It is therefore clear that although the preheating of the substrate is important to obtain high resistance ratios in the deposited film the amount of preheating is not as critical as the control of the temperature of the substrate during the deposition of the film to produce a final substrate temperature of approximately 650° C.

The apparatus utilized to measure the resistance ratio of the deposited films can be seen with reference to FIG. 5. After the electrical excitation of cathode 12 to dislodge the niobium atoms and the disposition of the atoms upon the substrate, a one-inch by one-quarter inch sample 40 of the deposited film was obtained and a constant current from source 41 was passed through the sample. A high impedance volt meter 42 was then placed across two terminals 43 and 44 positioned along the length of the sample and the voltage drop between the terminals was measured both at 298° K. and at a temperature just above the superconducting critical temperature of the sample. The resistance ratio was determined from the recorded measurements utilizing the following formula:

$$R=R_n-R_s/R_s$$

wherein $R_n$ is the resistance of the sample at 298° K. and $R_s$ is the resistance of the sample in its normal state just above its superconducting critical temperature.

The unexpectedly high resistance ratios obtainable when the surface of the substrate remote from the cathode is controlled to produce a temperature in the range of from 535° C. to 690° C. can be observed from the following examples:

EXAMPLE I

A high purity niobium plate cathode 1.5" x 3.5" x 0.06" was placed in an isolated chamber approximately 1" from a nonmetallic refractory substrate, e.g., 96% silica glass, having a thickness of 125 mils and the chamber was pumped to a pressure below one micron of mercury using a vacuum pump. Argon at a pressure of 125 microns was introduced into the chamber and the substrate was heated to a temperature of 250° C. before the initiation of sputtering by the application of a voltage of 3400 volts D.C. to the cathode. The current flowing into the system was measured at 200 milliamps and a cathode temperature rose to a value of 1100° C. as measured by an optical pyrometer. The sputtering deposited a niobium film on the substrate and the temperature of the substrate remote from the cathode was raised from 250° C. to a final temperature of 570° C. by the combination of the auxiliary heater and the heat emanating from the cathode. The resistance ratio of the deposited sample measured 4.50.

EXAMPLE II

The deposition of niobium film on the silica glass substrate of this example was carried out under conditions identical with the prior example. The preheat temperature of the substrate however was raised from 250° C. to 400° C. before the initiation of the sputtering. Sputtering was then commenced and continued until the substrate surface remote from the cathode had risen to a temperature of 650° C. The thin film produced in this sample was found to have a resistance ratio of 7.27.

EXAMPLE III

The deposition of niobium films on the substrate by cathode sputtering was performed under conditions identical with those of the first two examples, except for the preheating of the substrate to a temperature of 415° C., e.g., 15° greater than Example II. Sputtering of the niobium from the cathode was initiated and continued until the temperature of the substrate surface remote from the cathode had risen to a temperature of 675° C., e.g., 25° greater than Example II. The resistance ratio of the sample was measured to be 6.57.

EXAMPLE IV

This sample also was conducted under conditions identical with those of Example III except for the fact that the substrate was heated to a temperature of 485° C. before the initiation of the sputtering. Sputtering was continued until the surface of the substrate remote from the cathode had risen to a temperature of 705° C. Sputtering was then terminated and a sample of the deposited film was measured for its resistance ratio which was found to be 0.825. It will be appreciated from the following values that a decrease in the resistance ratio of approximately 87 percent was produced over the sample of Example III by an increase in the final temperature of the substrate surface remote from the cathode of only 4.5 percent.

EXAMPLE V

This sample was conducted under conditions identical with the prior examples except for the fact that there was no preheating of the substrate. The measured temperature of the substrate surface remote from the cathode rose to a value of 465° C. during the deposition process and the sample produced had a resistance ratio of 0.562.

It will be seen from the preceding examples and FIG. 3 that the resistance ratio of thin niobium films formed upon insulating substrates is markedly affected by the temperature of the substrate. Furthermore, there is a specific range between 535° C. to 690° C. as measured on the surface of the substrate remote from the cathode where extremely high resistance ratios are obtained for the niobium films. This result is all the more unusual due to the fact that prior to this time it had generally been supposed that the greatest reduction in oxygen impurities in the deposited films was obtained by a maximum heating of the substrate.

While several examples of this invention have been shown and described, it will be apparent to those skilled in the art that many changes and modifications may be made without departing from this invention in its broader aspects; and therefore the appended claims are intended to cover all such changes and modifications as fall within the true spirit and scope of this invention.

What we claim as new and desire to secure by Letters Patent of the United States is:

1. A method of depositing high purity niobium films on a substrate which comprises positioning at least one substrate within a chamber, positioning a niobium member within said chamber in proximate position with said substrate, introducing an inert gaseous atmosphere into said chamber, preheating said substrate to a temperature in excess of 25° C., electrically energizing said niobium member at a potential to produce rapid sputtering of said member and elevate the surface temperature of said member above 800° C., increasing the thermal content of said substrate to produce a temperature in the range of from 535° C. to 690° C. upon the surface of the substrate remote from said niobium member, and condensing on said heated substrate a film exhibiting superconductivity.

2. A method according to claim 1 including the preheating of said substrate to a temperature in the range of from 190° C. to 475° C. before energization of said niobium member.

References Cited

UNITED STATES PATENTS 3,271,285 9/1966 Skoda ------------- 204—192

OTHER REFERENCES

F. Vratny et al.: J. of the Electrochem. Soc., vol. 112, 29—599

ROBERT K. MIHALEK, *Primary Examiner.*

U.S. Cl. X.R.

29—599.